April 24, 1928.
G. W. HEISE ET AL
1,667,317
DRY CELL
Filed Nov. 18, 1922     2 Sheets-Sheet 1
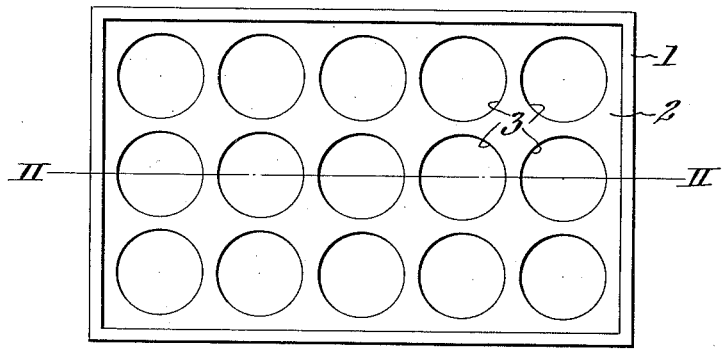
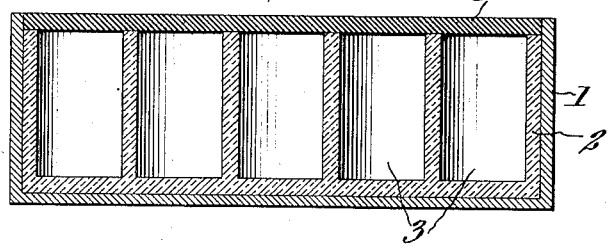
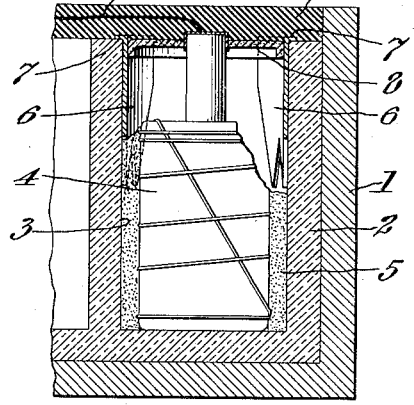
Inventors:
George W. Heise,
Harry H. Thompson,
by Byrnes, Townsend & Bickenstein,
Attorneys.

April 24, 1928.
G. W. HEISE ET AL
1,667,317
DRY CELL
Filed Nov. 18, 1922
2 Sheets-Sheet 2
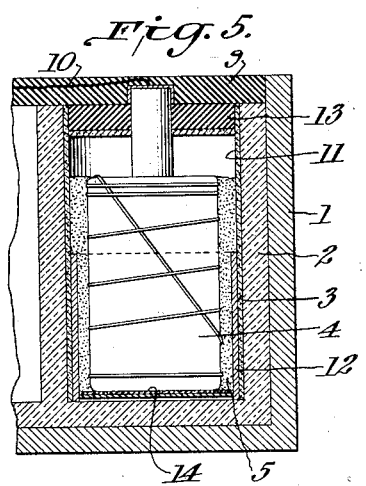
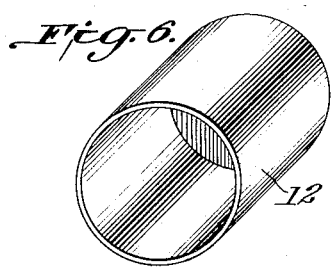
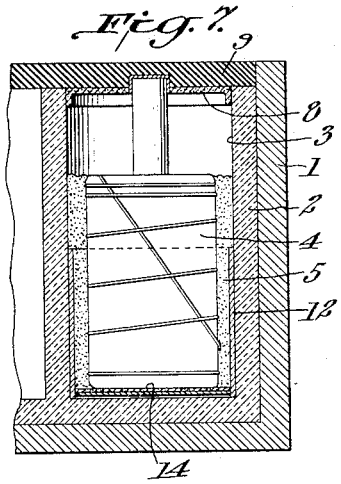
Inventors
George W. Heise,
Harry H. Thompson,
by Byrnes, Townsend & Brickenstein
Attorneys.

Patented Apr. 24, 1928.

1,667,317

UNITED STATES PATENT OFFICE.

GEORGE W. HEISE, OF BAYSIDE, AND HARRY H. THOMPSON, OF FLUSHING, NEW YORK, ASSIGNORS TO NATIONAL CARBON COMPANY, INC., A CORPORATION OF NEW YORK.

DRY CELL.

Application filed November 18, 1922. Serial No. 601,882.

This invention relates to dry cells and in particular to the construction of a dry cell battery especially adapted for radio work.

According to the present invention, the electrodes of each cell of the battery are received within a cavity in a block of suitable insulating and electrolyte-proof material, which may serve at least in part as the cell container. The usual zinc container-electrode is replaced by zinc members having a relatively small area exposed to the electrolyte.

The diminution of the zinc area, as in the construction described, is especially desirable where the battery is to be subjected to small current drains only, such as are required from "B" batteries in radio work. For the production of such currents only a small surface of zinc is necessary, and the presence of an unnecessary expanse of metal surface exposed to the electrolyte should be avoided because tending to shorten the life of the battery by corrosion on open circuit.

Since zinc does not polarize to an appreciable extent on discharge, particularly if the current drain be low, the concentration of the zinc into a body having a small effective surface is not accompanied by any disadvantages due to increased polarization.

An important advantage of the reduced area of zinc surface is that the resulting increased internal resistance makes it impossible to withdraw a very heavy current on circuit through a low resistance such as the heating filament of a vacuum tube, and the frequent accidental destruction of radio apparatus by improper connection of the "B" battery is thus to a large extent avoided.

The invention will be described in connection with the accompanying drawing, in which Fig. 1 is a top plan view of a container block for the cells;

Fig. 2 is a section on line II—II Fig. 1, and showing the casing sealed;

Fig. 3 is an enlarged vertical section through a portion of the container block, showing the current-producing elements of a cell in position;

Fig. 4 is a side elevation of one form of zinc electrode;

Fig. 5 is a section similar to that of Fig. 3, but showing a modified form of cell;

Fig. 6 is a perspective view of the short zinc cup used in the cell of Fig. 5, and Fig. 7 is a view similar to Fig. 5, but showing a modification.

Referring to Figs. 1 to 4 of the drawings, reference numeral 1 denotes a box or casing which may be made of wood, cardboard or other suitable material. The box 1 is filled with a block 2 of solidified plastic material not pervious to nor attacked by dry cell electrolyte. The plastic material may be pitch, wax, a composition having a waxy nature, or the like.

Cylindrical cavities 3 are formed in the block 2 and may have substantially the altitude and diameter of commercial dry cells of the flashlight type. For "B" battery purposes fifteen is a convenient number of cavities, but the invention is not limited to any particular number or conformation of the openings in the block. Cavities 3 may be satisfactorily formed by flowing the plastic around and beneath suitable mandrels placed in the casing, and removing the mandrels when the plastic has become sufficiently hard. A group of steel rods of the proper dimensions and greased to prevent sticking may be conveniently used.

A mix bobbin 4 is inserted in each of the cavities and electrolyte paste 5 is filled into the annular space between the bobbin and the block, or the paste and bobbin are otherwise suitably introduced. The anode consists of two arcuate zinc sheets 6 fixed in the upper part of the cavity and having their serrated lower margins only immersed in the electrolyte. The sheets 6 have a marginal flange 7 overlying the edge of the cavity. A disc 8 of pulpboard or the like is fitted into the top of each cavity and serves as a support for a seal 9, which is flowed over the whole assembly when all the cells are in position. Connecting wires 10 may be suitably attached before applying the seal.

In the form of the invention shown in Figs. 5 and 6, the cells are assembled before insertion in the cavities. The bobbin 4 and electrolyte 5 are placed in a waterproof paper tube 11, which contains a short zinc cup 12. The cell has a seal 13 of ordinary type. A sheet of paraffined pulpboard 14, or equivalent insulating material, lies between the bottom of the zinc cup and the bobbin.

The paper tube 11 may be made of sufficient strength to serve only for the assembly of the cell. After the cell is inserted in its cavity, ample support is provided and a heavy paper tube is therefore unnecessary. As in the device of Figs. 1 to 3, the block is chiefly relied upon as the container.

For convenience of assembly on a commercial scale the provision of the paper tube 11 is desirable, but the tube may be omitted, as shown in the cell illustrated in Fig. 7. In the form of the invention there shown, the zinc cup 12 and insulating sheet 14 are first placed in the cavity 3, and the bobbin and electrolyte paste are then introduced. A disc 8 and seal 9 of the type described in connection with Fig. 3 are then applied.

Instead of using a box or casing, the plastic material may be poured into a mold, removed, and used either with or without wrapping as a cell-supporting block. A boxed or wrapped construction is preferred, however, on account of the tendency of the solidified plastic to chip or break. In some cases cell-receiving cavities may be formed in suitable solid materials, such as hard rubber. It is obvious, also that the conformation of the zinc electrodes is largely immaterial so long as their area exposed to the electrolyte is relatively small. Various other modifications of the preferred constructions described herein may be made within the scope of the appended claims.

We claim:

1. A dry coil comprising a mix bobbin cathode immersed in electrolyte paste, and an anode in contact with the paste and having a smaller effective area than the corresponding oppositely disposed surface of the mix bobbin.

2. A dry cell comprising a container, a mix bobbin immersed in electrolyte paste therein, and a zinc member in contact with the paste and opposed to a portion only of the corresponding oppositely disposed surface of the mix bobbin.

3. A dry cell comprising a cathode immersed in electrolyte paste, and a tubular anode in contact with the paste and encircling the cathode, which said anode presents a greater surface in opposition to the cathode surface at certain heights in the cell than at others.

4. A galvanic cell assembly comprising a block of insulating material having a cavity therein, a depolarizing cathode in said orifice, an anode of less effective area than the cathode, and an electrolyte in operative relation to the anode and cathode, said cavity serving at least in part as the electrolyte container.

5. A dry cell assembly comprising a block of insulating material having a cavity therein, a cathode, electrolyte paste, and an anode, in operative relation in said cavity, said anode having its surface opposed to a portion only of the cathode surface.

6. A dry cell assembly for radio work and the like, comprising a block of insulating material having a plurality of cavities therein, electrolyte paste and a depolarizing cathode in each cavity, zinc anodes having a relatively small area in contact with the electrolyte as compared with the cathode, and means for connecting the separate cells to form a battery.

In testimony whereof, we affix our signatures.

GEORGE W. HEISE.
HARRY H. THOMPSON.